Patented Nov. 10, 1931

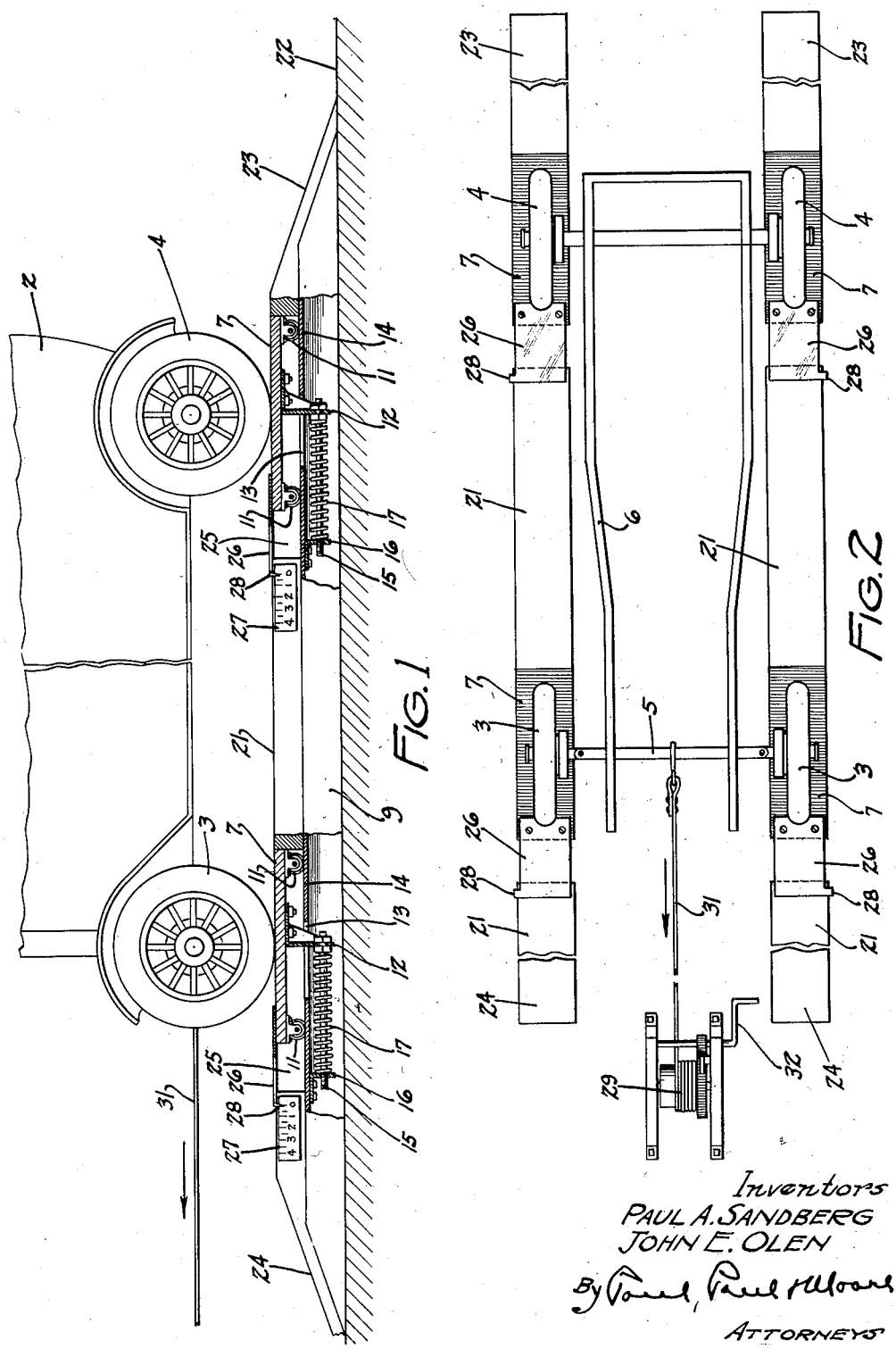

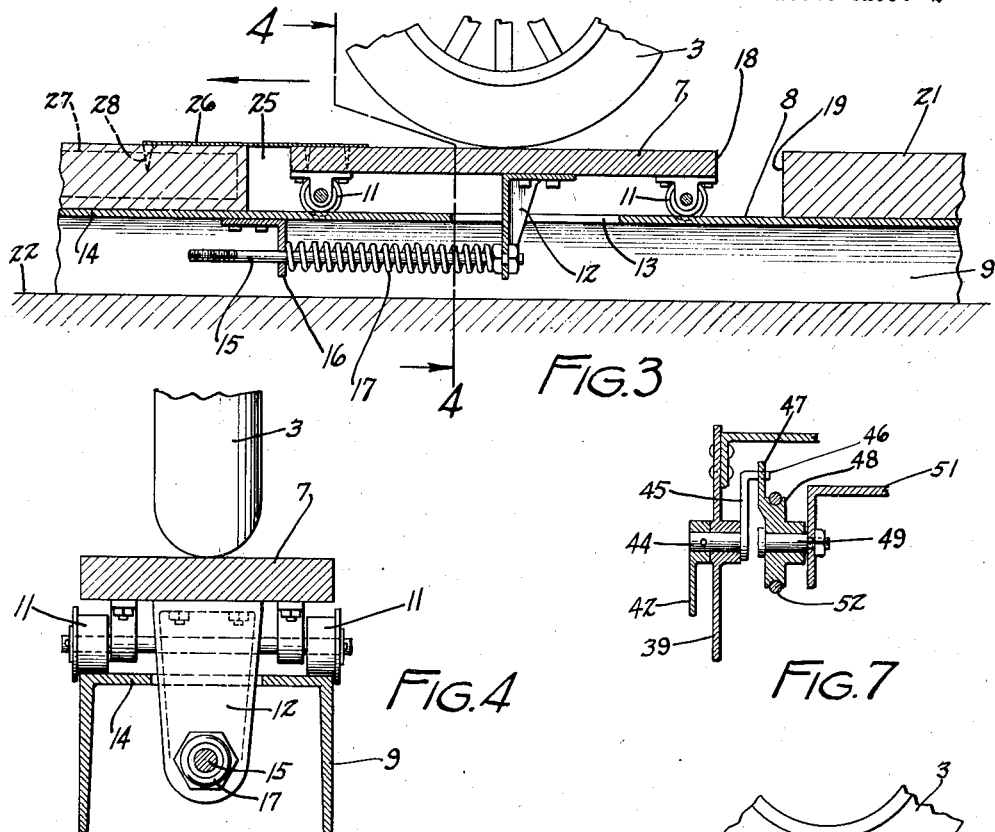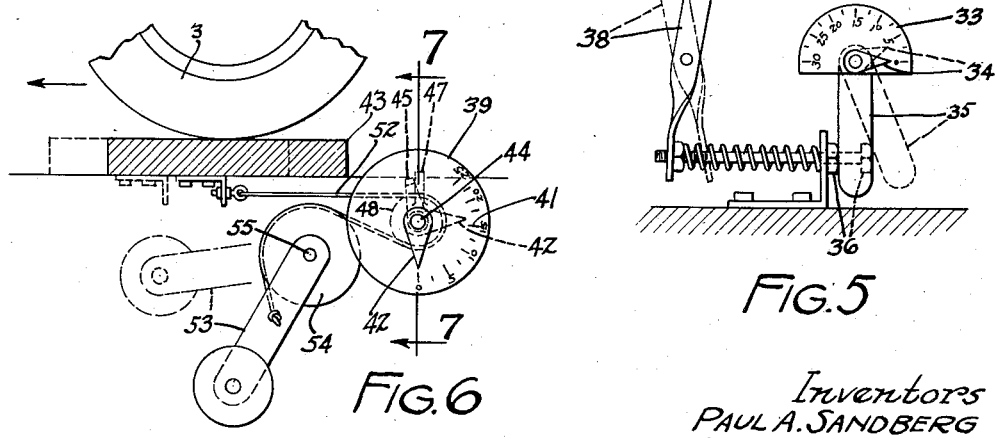

1,831,198

UNITED STATES PATENT OFFICE

PAUL A. SANDBERG, OF MINNEAPOLIS, AND JOHN E. OLEN, OF ST. PAUL, MINNESOTA

BRAKE-TESTING APPARATUS

Application filed April 9, 1928. Serial No. 268,732.

This invention relates to new and useful improvements in brake-testing apparatus, particularly adapted for use to test the brake resistance of brakes, such as are commonly used in connection with the wheels of motor vehicles, and an object of the invention is to provide such an apparatus wherein each wheel brake may be simultaneously independently tested and its brake resistance accurately determined and recorded, thus indicating to the driver of the vehicle whether or not his brakes are in proper adjustment.

A further object of the invention is to provide a brake-testing apparatus comprising independently movable carriages each adapted to support a wheel, and to be translated by the frictional engagement of said wheel therewith, and each carriage having an indicator connected therewith adapted to record the brake resistance of each wheel; and a power device being mounted remote from the vehicle and having means for connecting it therewith to move the latter forwardly, with its brakes set, whereby each indicator will accurately record the brake resistance of the wheel brake associated therewith, so that the actual brake effort of each wheel brake may be independently determined; and, if one of the brakes is found to be out of adjustment with respect to the others, it may be adjusted so that its brake resistance will correspond to that of the other brakes.

The particular object of the invention therefore is to provide an improved brake-testing apparatus adapted to simultaneously test the brake resistance of all of the wheel brakes, and to independently record the brake resistance of each brake.

Other objects of the invention will appear from the following description and accompanying drawings and will be pointed out in the annexed claim.

In the accompanying drawings, there has been disclosed a structure designed to carry out the various objects of the invention, but it is to be understood that the invention is not confined to the exact features shown as various changes may be made within the scope of the claim which follows.

In the accompanying drawings forming part of this specification:

Figure 1 is a side elevation of the apparatus, partially broken away to show the construction thereof and also showing a vehicle positioned thereon;

Figure 2 is a diagrammatic plan view of Figure 1;

Figure 3 is an enlarged detailed sectional view showing one of the carriages moved forwardly to indicate the adjustment of the brakes;

Figure 4 is an enlarged detailed sectional view on the line 4—4 of Figure 3;

Figure 5 is a diagrammatic view illustrating a modified construction;

Figure 6 is a diagrammatic view illustrating another modified construction; and

Figure 7 is a detail sectional view on the line 7—7 of Figure 6.

In the selected embodiment of the invention here shown, there is illustrated, for purposes of disclosure, a motor vehicle 2 comprising the usual front and rear wheels 3 and 4, respectively, front axle 5, and the chassis 6.

The preferred embodiment of the invention is shown in Figures 1, 2, 3, and 4, and comprises a plurality of carriages 7 supported upon suitable tracks 8, here shown as consisting of channel-irons 9. (See Figure 4.) Each carriage is adapted to support a vehicle wheel, as shown in Figures 1 and 2. As the carriages and their associated parts are similar, but one such mechanism will be described, it being understood that like numerals indicate like parts in the various figures.

Referring to Figures 3 and 4, each carriage 7 is supported upon suitable flanged wheels 11 adapted to travel upon the upper opposed corners of a channel iron 9. A bracket 12 is secured to the bottom of the carriage 7 and depends through an elongated opening 13 provided in the web 14 of the channel member 9. A rod 15 has one end suitably secured to the lower end of the bracket 12, and has its opposite end mounted in a guide 16 adjustably secured to the web 14 of the channel member 9. A suitable spring 17 is coiled about the rod 15 between the brackets 12 and 16, and normally retains the carriage in the position shown in Figure 1, wherein it will be noted that its end portion 18 abuttingly engages the wall 19 of the run-way 21. In the drawings, we have shown the run-way 21 elevated above the floor 22, and the opposed ends thereof sloping downwardly, as indicated at 23 and 24 in Figure 1, so that the vehicle may readily be moved from the floor onto the carriages 7.

The carriage 7 is adapted to travel forwardly and backwardly in a recess 25 provided in the run-way 21, as shown in Figures 1 and 3, and the top surface of the carriage is substantially alined with the top surface of the run-way 21.

A plate 26 has one end secured to one end of the carriage 7, and has its other end supported upon the run-way 21, so as to bridge the gap between the carriage and the adjacent end of the run-way 21, to permit the vehicle wheels to pass over this gap, after the brakes have been tested. An indicator is provided for each carriage and each comprises a suitably graduated scale 27, as shown in Figure 1. A pointer 28 may be provided on the plate 26, and this pointer is movable with the carriage to independently indicate the amount of travel of each carriage, as the vehicle is moved forwardly.

An important feature of this invention resides in the manner of moving the vehicle forwardly during the brake-testing operation, and when the wheel brakes are set. Figure 1 illustrates the position of the vehicle upon the carriages after the brakes have been set and the vehicle is about to be moved forwardly to test the adjustment of the brakes. In the present invention, the vehicle is not moved forwardly by its own power, but by means of a suitable power device, in this instance, a windlass 29, having a cable 31 adapted to be detachably connected with the forward end of the vehicle as, for example, with the front axle 5. The windlass may be manually operated by a crank 32, or, if desired, it may be power driven. The constructional details of the power device forms no part of the present invention and it is therefore thought unnecessary to describe same in detail.

To test the brakes, the vehicle is positioned upon the carriages 7, as shown in Figures 1 and 2, and the cable 31 of the windlass 29 is secured to the vehicle axle 5 as shown in Figure 2. The windlass 29 is then operated to move the vehicle forwardly against the resistance of the springs 17. Such movement of the carriages results because the frictional engagement of the wheels therewith as a result of the brakes being set. Continued forward movement of the vehicle and carriages, as the windlass is operated, will increase the opposing forces in the springs 17, and, when these forces overcome the frictional engagement of the wheels with the carriages, the wheels will slide or drag on the carriages, after which further forward movement of the carriages will cease. The windlass is then interrupted and locked against unwinding so that the operator may note the reading on the four indicators. If these all read alike, the operator may be assured that the brakes are all uniformly adjusted.

On the other hand, should one or more of the brakes not be properly adjusted, then the wheels associated with such brakes will commence to rotate before the wheels whose brakes are properly adjusted, begin to slide upon the carriages, thereby showing a lower reading upon the indicators recording the brake resistance of the wheels whose brakes are not properly adjusted. Thus, it will be seen that by the employment of this novel brake-testing apparatus, all the wheel brakes on a vehicle may be simultaneously independently tested and the brake resistance of each brake recorded.

We are aware of the fact that there are now several devices in use for testing wheel brakes, but none of these employ the use of a power device located remote from the vehicle for translating the vehicle during the brake-testing operation. It will readily be seen by reference to Figures 1 and 2 that by translating the vehicle by the windlass 29, after the vehicle has been positioned upon the apparatus, and its brakes set, that the vehicle may be moved slowly forwardly until the wheels begin to drag over the surfaces of the carriages, after which the windlass is interrupted and the readings of the various indicators taken. As before stated, if these readings do not correspond, the brakes are readjusted until they do. The apparatus is also very simple and inexpensive in construction, and may be manufactured at a very small cost.

As shown in Figures 1 and 2, the apparatus may be constructed of two units, each comprising two carriages. These units, it will be noted, are comparatively narrow and therefore require very little space for storage. When in use, they may be placed upon the floor of a garage and the windlass positioned as shown in Figure 1, it being understood, of course, that the windlass and units are preferably anchored to the floor so that they will not be translated over the surface thereof, when the windlass is operated to move the vehicle. In actual practice, the coiled springs 17 are preferably arranged in such a manner that their tension may be varied or relatively adjusted with respect to one another so that the opposing forces exerted thereby against their complementary carriages will be uniform.

Figure 5 illustrates a modified form wherein the indicator comprises a semi-circular fixed member 33, graduated as shown and having a pointer 34 rotatably mounted thereon to which one end of an arm 35 is connected.

The lower end of this arm is translated by a spring-actuated bolt 36, operable by the carriage 37 through a pivoted arm 38. In the form here shown, the pointer 34 and arm 35 are frictionally engaged with the semi-circular member 33, to cause the arm 35 to remain in the positions to which it is moved by the bolt 36, after the bolt recedes to its normal position. Thus the pointer 34 will be frictionally held in position on the member 33 to record the brake resistance of the wheel brake. The arm 35 and pointer 34 are manually returned to their normal positions, shown in full lines.

Figures 6 and 7 illustrate another modification comprising a disk 39 having a suitable scale 41 on one side thereof co-operable with a pointer 42 to indicate the movement of the carriage 43, or the brake resistance of the wheel brake. In this construction, the disk 39 is stationary and the pointer 42 is mounted upon a shaft 44, rotatably born in the member 39 and having an arm 45 provided with a detent 46 positioned in the path of an arm 47, secured to a small grooved pulley 48 rotatably mounted upon a stud 49, suitably secured to a fixed member 51. The grooved pulley 48 is operable by a cable 52 having one end secured to the carriage 43 and its other end to a weighted arm 53, preferably secured to a pulley 54 mounted upon a stud 55. The operation of the indicator 42 is similar to that of the indicator 34 shown in Figure 5, in that it is adapted to be manually returned to its normal position, when the carriage returns to its normal position.

We claim as our invention:

In an apparatus for testing the brakes of an automobile, a pair of spaced tracks each having recesses therein, a wheeled carriage mounted in each recess and each adapted to support a wheel of the automobile, the top surfaces of said carriages being substantially alined with the top surfaces of said tracks, means yieldingly resisting movement of said carriages in one direction, an indicating device operatively connected with each carriage for independently indicating the brake resistance of each wheel, each of said indicating devices comprising elements mounted for relative movement, and a power device independent of the vehicle having means for connecting it with said vehicle whereby the vehicle may be moved with its brakes set, thereby causing all of said carriages to be relatively moved because of the frictional engagement of the wheels therewith, whereby said indicating devices will be simultaneously actuated to independently register the brake resistance of their respective wheel brakes.

In witness whereof, we have hereunto set our hands this 4th day of April, 1928.

PAUL A. SANDBERG.
JOHN E. OLEN.